Feb. 28, 1939.  E. R. BOND ET AL  2,149,204
MEANS FOR ENCASING THE RIBS OF LOOM REEDS AND THE LIKE
Filed Jan. 29, 1937  6 Sheets-Sheet 1

Inventors:
EDGAR R. BOND
AND
CLARENCE A. HOBBS
BY
Attorney

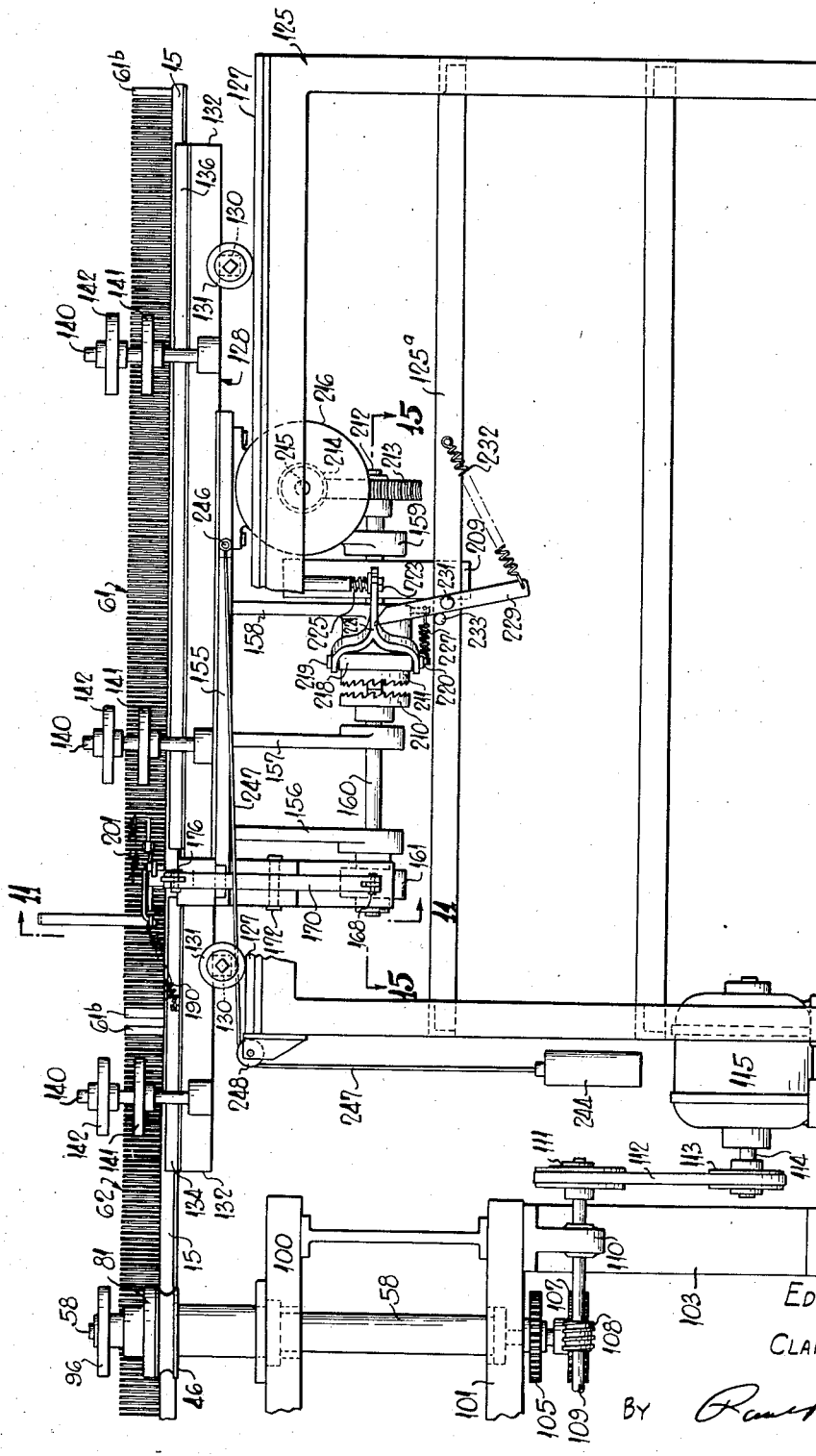

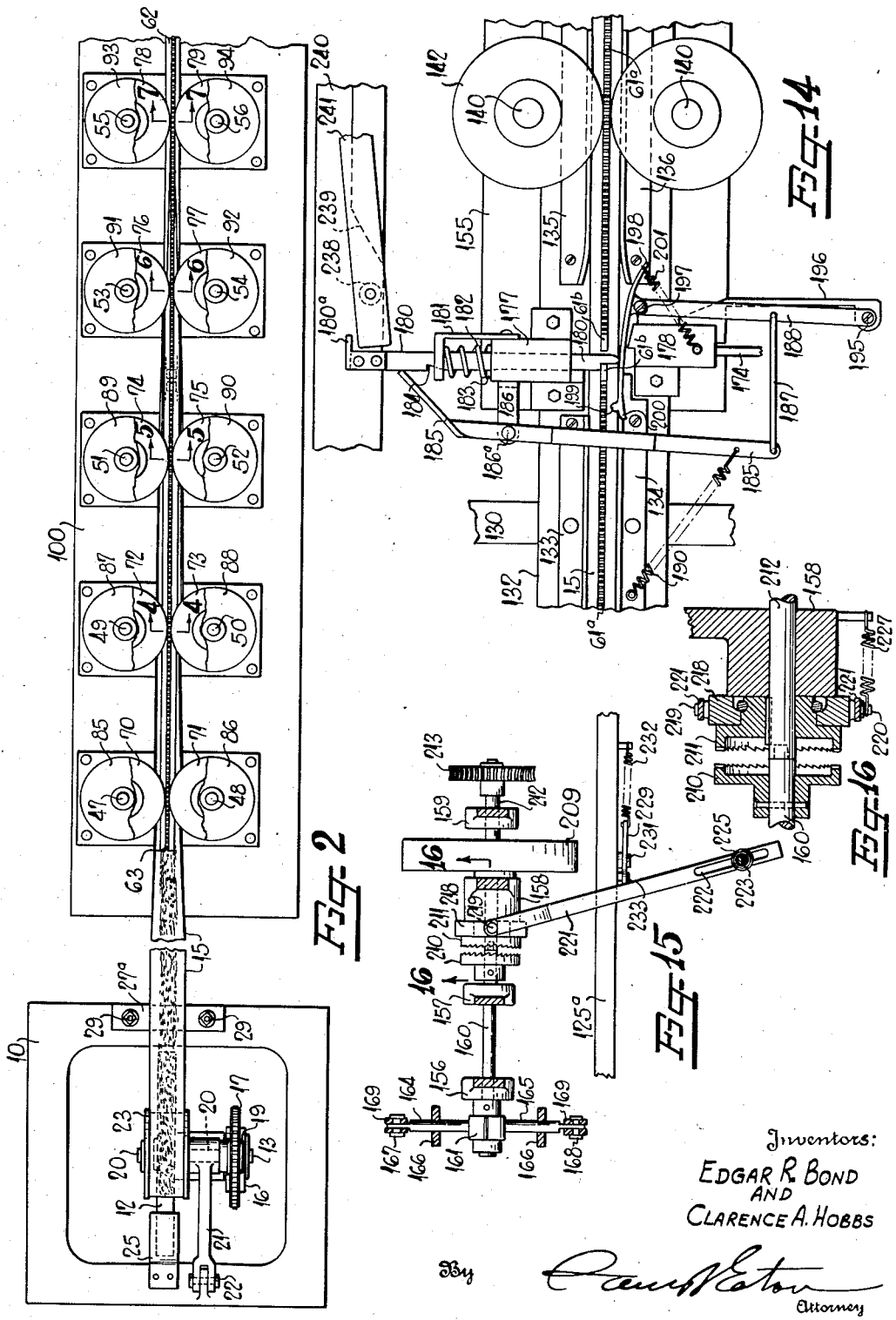

Feb. 28, 1939.　　　　E. R. BOND ET AL　　　　2,149,204
MEANS FOR ENCASING THE RIBS OF LOOM REEDS AND THE LIKE
Filed Jan. 29, 1937　　　　6 Sheets-Sheet 4
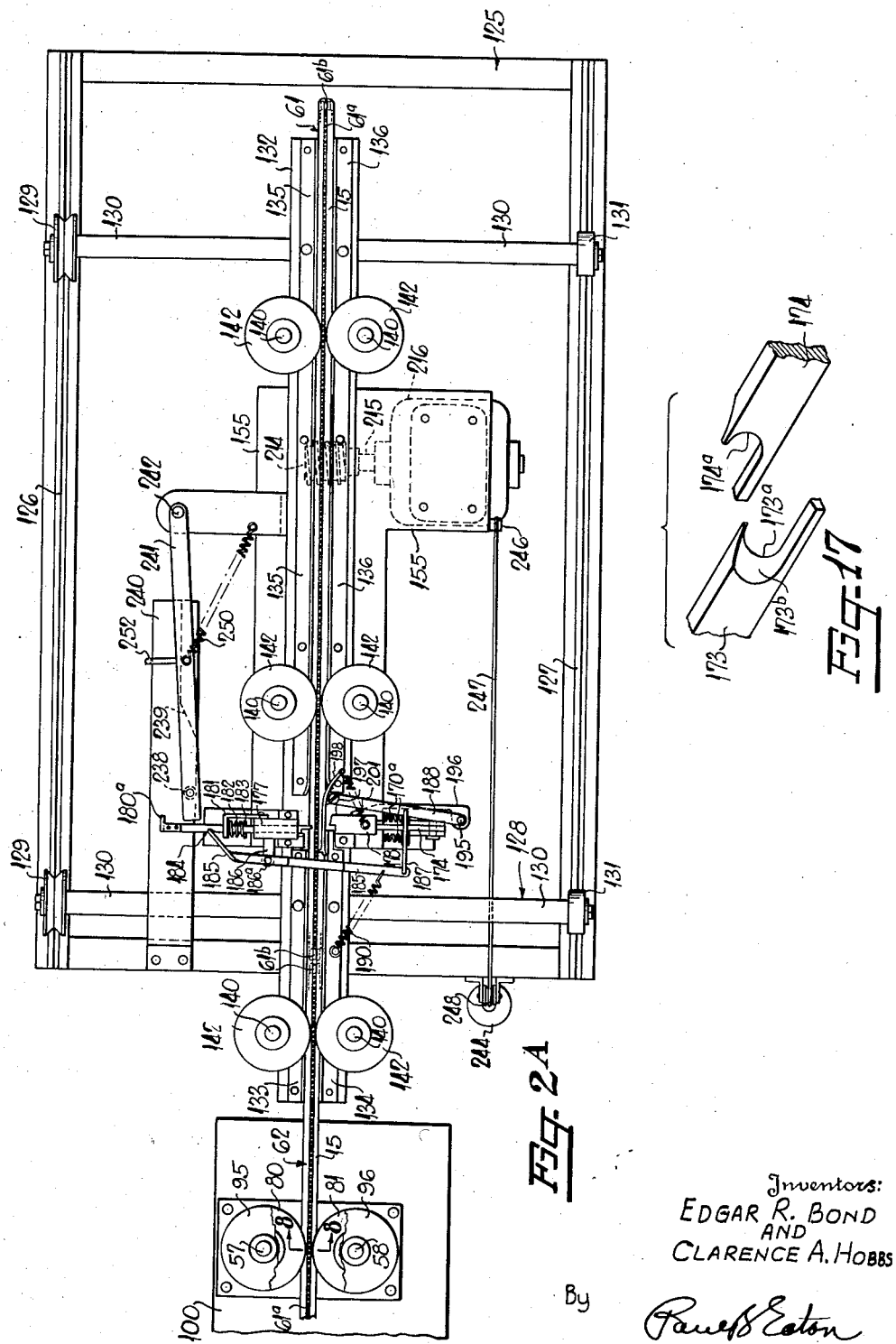
Inventors:
EDGAR R. BOND
AND
CLARENCE A. HOBBS
By
Paul B Eaton
Attorney Feb. 28, 1939.  E. R. BOND ET AL  2,149,204
MEANS FOR ENCASING THE RIBS OF LOOM REEDS AND THE LIKE
Filed Jan. 29, 1937  6 Sheets-Sheet 5
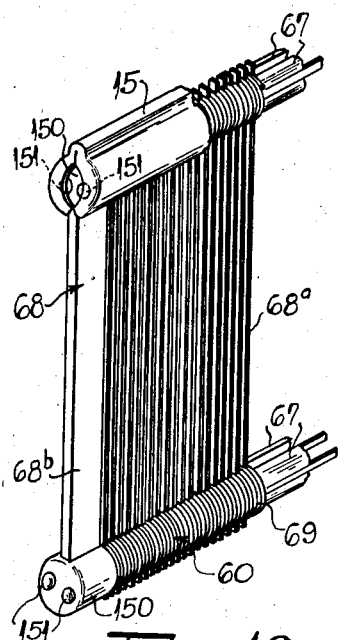
Fig-3
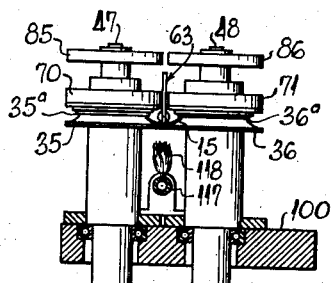
Fig-4
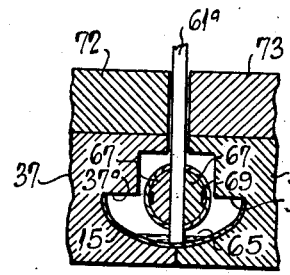
Fig-5
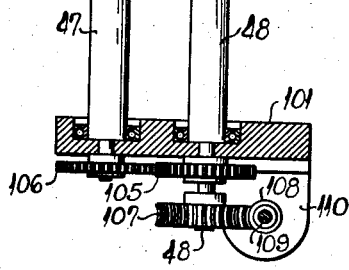
Fig-6
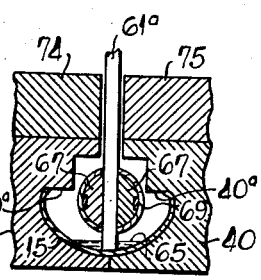
Fig-7
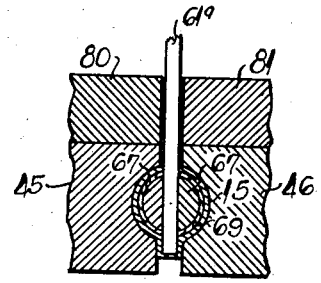
Fig-8
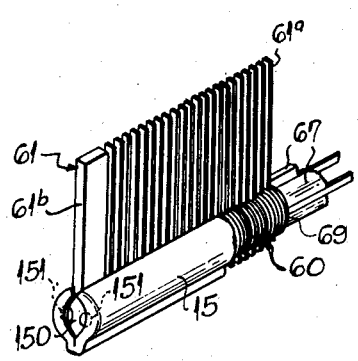
Fig-9
Fig-10
Inventors:
EDGAR R. BOND
AND
CLARENCE A. HOBBS
By
Attorney

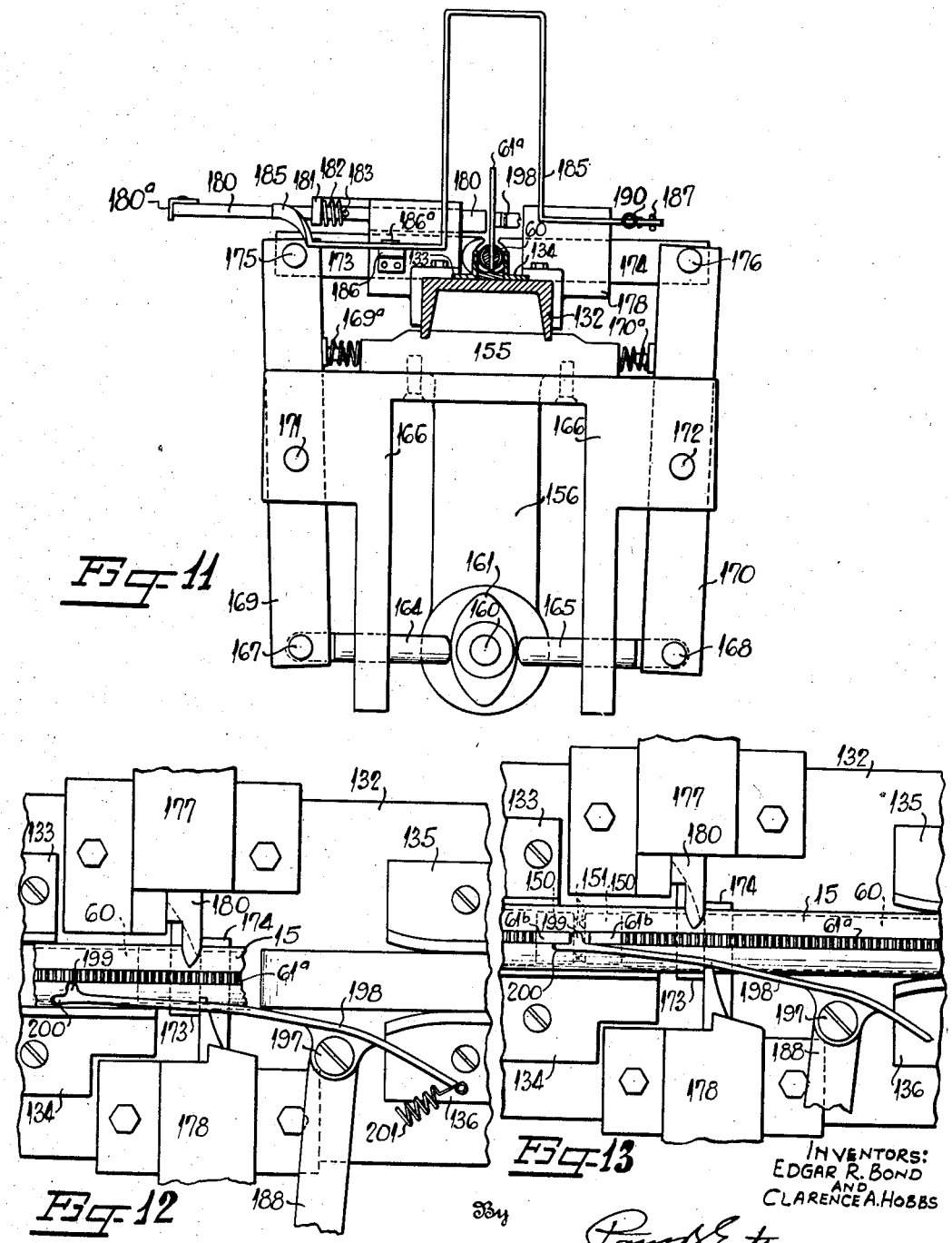

Patented Feb. 28, 1939

2,149,204

UNITED STATES PATENT OFFICE 2,149,204

MEANS FOR ENCASING THE RIBS OF LOOM REEDS AND THE LIKE

Edgar R. Bond and Clarence A. Hobbs, Greensboro, N. C., assignors to Textile Specialty Company, Greensboro, N. C., a corporation of North Carolina Application January 29, 1937, Serial No. 122,896

10 Claims. (Cl. 153—1)

This invention relates to a method and means for encasing the ribs of loom reeds, warp combs, and the like, in order that the finished rib may gauge correctly as to diameter at all points thereon.

Heretofore, in the manufacture of cotton reeds of the pitch band type, it has not been possible to get an accurate gauge of rib the entire length. This irregularity on the diameter is caused partially from the half-round wood strips which are used on each side of the splits and clamped therearound by a pitched twine. These wood strips are subject to a varying amount of shrinkage since they do not generally have a uniform degree of hardness. Also, the tension on the pitched twine will grow greater as the diameter of the spool grows smaller during the formation of the reed resulting in a tighter winding of the pitched yarn as the spool becomes empty.

All of this variation in the gauge of a rib of reeds and combs causes much trouble in cotton weaving. For example, a loom may be alined to take a certain reed and upon turning this reed end for end, or turning the reed up-side down, the inaccuracy of the rib will necessitate the re-alining of the loom because the ribs are not accurate and the splits are not properly centered. Should the loom not be alined every time a reed is installed, the loom will not operate smoothly and the wear on the shuttle will be excessive.

It is therefore, an object of this invention to provide a loom reed or comb having the rib thereof encased in a metallic sheet or band of a uniform diameter, this band being adhesively secured to the ends of the splits in the reed and to the ribs of the reed or comb, and also having the ends thereof projecting past the ends of the ribs and partially covering the ends of the rib to additionally secure the band on said rib.

It is a further object of this invention to provide an apparatus for encasing the ribs of loom reeds, warp combs and the like, comprising means for rendering adhesive one side of a continuous band of material, a die forming means, means for passing a plurality of loom reed ribs or warp combs, end to end, through the die forming means along with the adhesive band, whereby the adhesive band is adhesively secured around the periphery of the rib. Means are also provided for intermittently severing the bands at the end of each rib and at the same time crimping the band in such a manner that the end of the band will partially encircle the end of the rib. It has been found that by adhesively securing a metallic band around the ribs of loom reeds or combs the adhesive necessary to secure this band thereon also gives the projecting ends of the splits which extend beyond the rib an additional anchoring strength so that these splits will not become loose due to vibration occurring during use of the reeds or combs.

The reed, comb and the like, herein shown, is claimed in a divisional application, Serial No. 237,282, filed October 27, 1938.

Some of the objects of the invention having been stated, other objects will appear as the description proceeds when taken in connection with the accompanying drawings, in which:—

Figure 1A is an elevation of the other portion of the apparatus;

Figure 2 is a plan view of the portion of the apparatus shown in Figure 1;

Figure 2A is a plan view of the portion of the apparatus shown in Figure 1A;

Figure 3 is a vertical, sectional view taken along line 3—3 in Figure 1;

Figure 4 is an enlarged, detail, sectional view taken along line 4—4 in Figure 2;

Figure 5 is an enlarged, detail, sectional view taken along line 5—5 in Figure 2;

Figure 6 is an enlarged, detail, sectional view taken along line 6—6 in Figure 2;

Figure 7 is an enlarged, detail, sectional view taken along line 7—7 in Figure 2;

Figure 8 is an enlarged, detail, sectional view taken along line 8—8 in Figure 2A;

Figure 9 is an isometric view of a portion of a comb after its rib has been encased in a metallic cover;

Figure 10 is an isometric view of a loom reed showing one rib thereof prior to the placing of a metallic cover thereon and showing the other rib with the metallic cover placed thereon;

Figure 11 is a vertical sectional view taken along line 11—11 in Figure 1A;

Figure 12 is an enlarged plan view of the central portion of Figure 2A showing the means for intermittently severing and securing the metallic band at the end of the reeds or combs;

Figure 13 is an enlarged view similar to Figure 12 but showing the position of the parts after the rib has advanced to trigger engaging position;

Figure 14 is an enlarged sectional view similar to the central portion of Figure 2A but showing the position of the parts after the reed has moved slightly farther than the position shown in Figure 13 to a point where the latch is engaged between the ends of the combs;

Figure 15 is a sectional plan view taken along line 15—15 in Figure 1A;

Figure 16 is an enlarged vertical sectional view taken along line 16—16 in Figure 15;

Figure 17 is an exploded, isometric view showing the two knives which are used for severing and securing the ends of the metallic band around the ends of the loom ribs or comb ribs.

Figure 1:
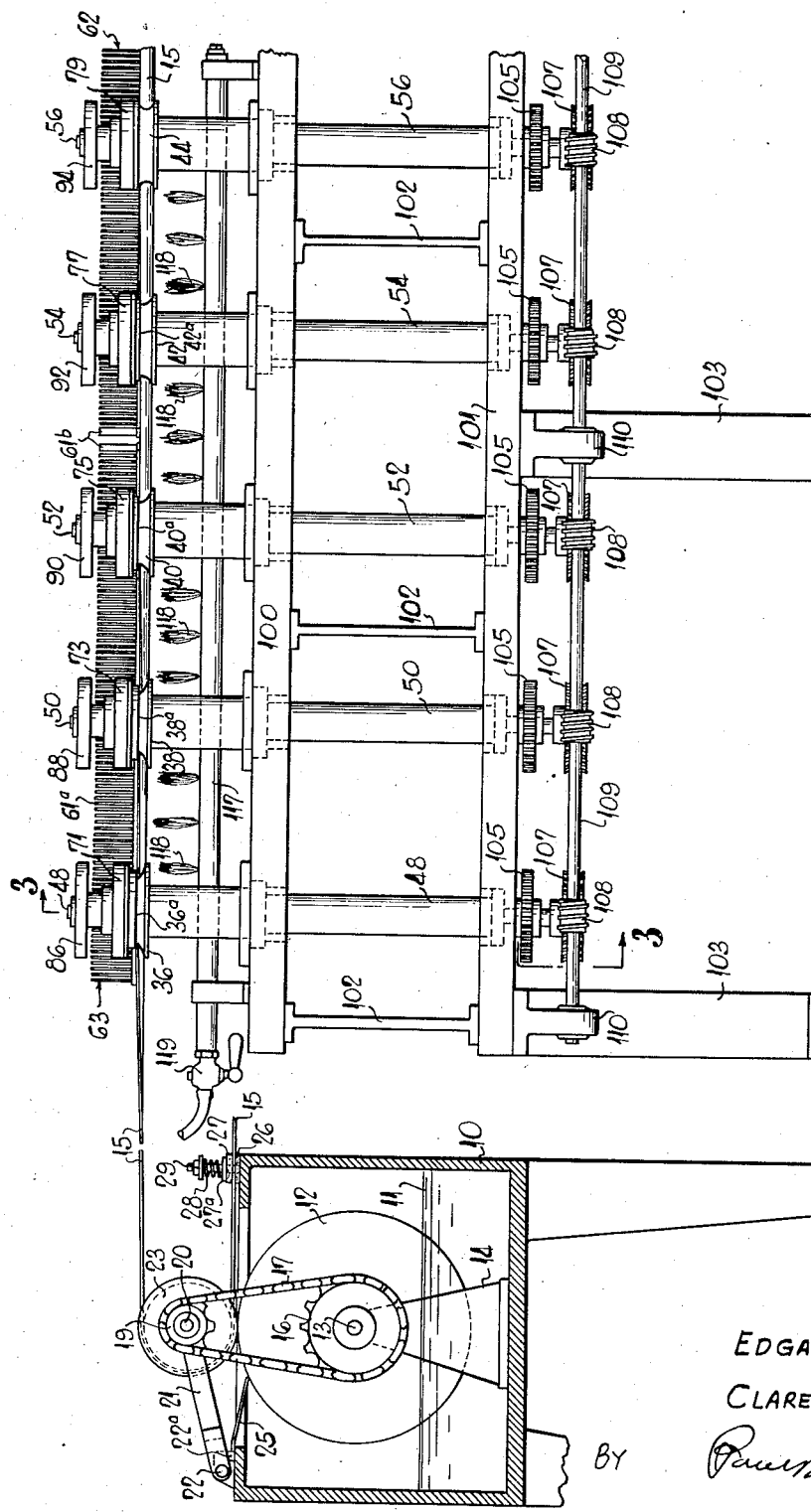
Figure 1 is an elevation of the left-hand portion of the apparatus showing certain parts thereof in section.

Referring more specifically to the drawings, the numeral 10 denotes a container for a suitable adhesive material 11. A roller 12 is rotatably mounted upon a shaft 13 said shaft being rotatably mounted on a bracket 14 which bracket is disposed within the container 10. The roller 12 has the lower portion thereof normally disposed within the adhesive material 11, and as it rotates it is adapted to gather this material upon its periphery and apply the same upon one side of a suitable band 15. The shaft 13 has a sprocket 16 secured on its end and this sprocket has mounted thereon a sprocket chain 17, which likewise rotates upon another sprocket 19 on shaft 20. The shaft 20 is rotatably mounted in bracket 21 which is pivotally secured as at 22 to the top of container 10.

The other end of shaft 20 has fixedly secured thereon a flanged roller 23 around which the band 15 is drawn from a suitable source of supply which is usually a large roll of the band material. It should be noted that the band 15 does not touch the periphery of roller 12, but the position of roller 23 relative to roller 12 is so adjusted that the band 15 will pass close enough to the periphery of roller 12 to gather the necessary adhesive material therefrom. The projection 22a limits the position which the roller 23 occupies relative to roller 12. In order to prevent an excessive amount of adhesive from adhering to one side of band 15 a wiper 25 is provided which has one end thereof secured to the top of container 10, and its other end disposed close enough to roller 12 so as to prevent an excessive amount of adhesive from being applied to band 15.

The band 15 first passes between members 26 and 27 which are made of any suitable friction material such as leather or the like. The top layer 27 is normally held in engagement with the upper side of the band 15 by means of suitable tension springs 28. These springs encircle bolts 29 which bolts have a washer and a nut on the upper side thereof for regulating the amount of friction desired to be placed upon this band. A metallic strap 27a is loosely mounted on bolts 29 and disposed between the lower ends of springs 28 and the upper side of friction member 27 so that the pressure exerted by springs 28 will be properly applied to the band 15.

As the band 15 passes between the rollers 12 and 23 the adhesive material is placed thereon. It should also be noted by referring to Figure 2, that the width of the adhesive material is considerably narrower than the width of the band 15 in order that there may not be any overflow after the band has been encased around the rib during the subsequent operations which will be presently described.

After the band 15 has been rendered adhesive, it then passes to the right in Figures 1 and 2, after which it is subjected to six different bending or crimping operations whereby the band is formed around the rib of a loom reed or comb. The crimping or forming rolls are designated by the reference characters 35 to 46 inclusive, which are mounted upon shafts 47 to 58 inclusive, respectively, (Figures 1 to 10). The rib 60 of a suitable loom reed or comb is placed directly on top of adhesive band 15, and is fed between the rollers 35 to 46 inclusive, along with the band. Figures 3 to 8 inclusive, show the successive formations of the band 15 as they pass between the various pairs of rollers. It will be noted however, at first the band 15 is slightly bowed, whereas, in the second and succeeding operations, the sides of this band are gradually drawn closer to the periphery of the rib 60. As this formation takes place there is a tendency for the strip of adhesive material, which is placed on band 15, to collect as at 65 in the lower side of the trough which is formed, and later be pressed between the lower ends of splits 66, thereby forming an additional securing means for the ends of these splits and prevent the same from becoming loose due to the vibration arising from use of the reed.

Rollers 35 to 42 inclusive have shoulders 35a to 42a inclusive, respectively, which are so positioned that the bending of the metallic band 15 will be symmetrical about the center line of the splits 61a during the formation of this band around the ribs. This of course, means that the peripheral contact or engagement of the band 15 with the surfaces of the rollers 35 to 42 inclusive, between each pair of shoulders, shall be the same. For example, the length of peripheral contact between the shoulders 35a and 36a which engages the lower side of band 15 in Figure 3, is the same in length as the peripheral contact between shoulders 37a and 38a in Figure 4, and so on in Figures 5 and 6. This will keep the band 15 properly positioned at all times during its formation so that when the band is completely finished, the edges of the band 15 will properly contact the opposed sides of the splits 61a and thereby present a finished appearance.

Disposed directly above the forming rolls 35 to 46 inclusive are suitable guide rolls 70 to 81 inclusive, respectively. There is also a second set of guide rolls 85 to 96 inclusive, which are secured around the shafts 47 to 58, inclusive, respectively. The latter set, comprising rolls 85 to 96 inclusive, are only used in case a loom reed such as shown in Figure 10, is passed through the machine, in which case, it is necessary to have this additional guiding means to prevent any tilting of the reed. In the present showing, only a comb, such as shown in Figure 9, is used and therefore, the guide rollers 70 to 81 inclusive, are all that are necessary for holding the comb in its proper position.

The shafts 47 to 58 inclusive, are rotatably mounted in suitable plates or castings 100 and 101, said castings being held in spaced relation by suitable diaphragms 102. The lower end of casting 101 is supported by suitable supports 103. Each of the shafts 48, 50, 52, 54, 56 and 58 have a pinion 105 fixedly secured on the lower end thereof which is adapted to mesh with another pinion 106, said pinion 106 being disposed on the lower end of shafts 47, 49, 51, 53, 55 and 57. The lower end of each of the shafts 48, 50, 52, 54, 56 and 58 also have a worm gear 107 fixedly secured thereon which worm gears are driven by worms 108 fixedly secured on longitudinally disposed shaft 109, which is rotatably mounted in bearings 110 which project downwardly from the casting 101. The end of shaft 109, Figure 1A, has a pulley 111 upon which is mounted belt 112. This belt is also mounted upon motor pulley 113 which is fixedly secured on motor shaft 114 of motor 115. As the motor rotates the shaft 109 in a counter-clockwise manner in Figure 3, through members 111, 112 and 113, it is seen that the proper direction of rotation is imparted to the forming rolls which will thereby draw the loom reeds or combs along with the band 15 between these rolls to cause the band to be properly formed around the rib.

It frequently occurs that the adhesive material which is disposed in the container 10 has a high viscosity and it is necessary to maintain it at a relatively high temperature while the band 15 is being formed around the rib. Therefore, a suitable pipe 117 has been provided which has suitable holes disposed in the upper side thereof to allow gas to escape therefrom. When this gas is ignited, flames 118 will be disposed directly beneath the center line of band 15 which will keep the adhesive material at its proper temperature and also render the band more pliable. A valve 119 is provided at the end of pipe 117 which can be operated to adjust the height of the flames desired and thereby regulate the temperature of the band 15.

After the reeds have passed beyond the forming rolls 45 and 46, the rib has been completely encased by the band 15. In order to make the operation a continuous one, the combs 61, 62 and 63 and so on, are fed through the forming rolls, end to end, so that all of the ribs may be properly encased, and also, so that a greater production may be attained. It is necessary however, that means be provided for severing this band at the proper point between the ribs 60 of combs 61, 62 and 63, and it is likewise necessary to provide means for properly securing the severed ends around the ends of the ribs at the time it is severed. This automatic severing and securing means has been mounted upon a suitable framework 125, which framework has trackways 126 and 127 secured upon the upper side thereof. Upon these trackways a carriage 128 is mounted for longitudinal movement relative to the frame at the desired time. This carriage comprises a pair of rollers such as 129 which are rotatably secured on the ends of axle 130, the other ends of said axle 130 having rollers 131 rotatably mounted thereon. Secured intermediate the ends of the axles is a longitudinally disposed channel member 132 which has secured to the upper surface thereof suitable angle guides 133, 134, 135 and 136, between which the ribs 60 and the band 15 are adapted to pass after the band has been adhesively formed around the ribs.

Disposed on opposed sides of channel members 132 are vertical shafts 140 on which are rotatably mounted lower guide rolls 141 and upper guide rolls 142. It will be noted that these rolls are placed in pairs substantially the same as the guide rollers 85 to 96 inclusive, and serve the same function. That is, the lower rollers 141 are used in case a comb is passed between the rollers whereas, both the rollers 141 and 142 are used when a comb or loom reed of a greater depth is placed therebetween which necessitates the provision of additional guiding means.

In the construction of warp combs or reeds, such as 61 or 68, the ribs are formed of semi-circular half-round members such as 67, between which are placed the splits 61a or 68a, (Figures 9 and 10). These splits are usually spaced by a spirally arranged pitched cord 69. At the end of the comb or reed, an end bar such as 61b or 68b is provided which is likewise disposed between the semi-circular half-round members 67. In order to properly secure this end bar in position, a cap member 150 is inserted over the ends of the members 67 and astride the end bars 61b and 68b. Then suitable round headed nails 151 are driven into the ends of the ribs to secure the cap member 150 in place. The thickness of the end of cap member 150 together with the height of the nail heads 151 add a small amount to the overall length of the rib which amounts to perhaps one-sixteenth of an inch or more.

It is therefore, seen by referring to Figure 13, that when the ribs are placed end to end and drawn through the machine the distance between the end bars 61b of two different combs will be one-eighth of an inch or more. In this gap a suitable feeler 198 is adapted to penetrate when the reeds have reached a predetermined point. The function of this feeler is to render operative the severing means at the proper time so that the metallic band 15 will be severed between the ribs and secured around these ends at the same time.

The lower side of channel member 132 has secured thereto a plate casting 155, the lower end of which supports a part of the automatic severing means. Projecting downwardly from the lower side of plate 155 are bearings 156, 157, 158 and 159 in which is rotatably mounted a shaft 160. On the left-hand end of shaft 160 in Figure 1A, there is fixedly secured an oval shaped cam 161 which has its opposed sides contacted by suitable pins 164 and 165 which pins are slidably mounted in the lower portion of bracket 166. The outer ends of pins 164 and 165 are pivoted as at 167 and 168 to vertically disposed levers 169 and 170 respectively, (Figure 11). Likewise these levers 169 and 170 are pivoted in the bracket 166 as at 171 and 172 respectively, and the upper end of these levers are pivoted to the outer ends of knives 173 and 174, as at 175 and 176 respectively. The pins 164 and 165 are held in engagement with cam 161 by means of compression springs 169a and 170a which engage the upper portions of levers 169 and 170. These springs tend to rotate the levers 169 and 170 in counterclockwise and clockwise directions respectively.

The knives have cuttings edges 173a and 174a respectively, which are adapted to move inwardly towards the center line of the rib and sever the metallic band 15 when the severing point or the end of a rib has reached the proper position so that the knives can sever the band without severing the rib. It will be noted that these knives are placed with two of the faces coinciding with each other so that the cutting edges of the knives can be moved in opposite directions past each other when the cutting mechanism is operated. The knives 173 and 174 are slidably mounted in brackets 177 and 178 respectively, which, in turn, are secured to the channel member 132. Also, slidably mounted in bracket 177 is a latch member 180, one end of which normally clears the splits 61a of the combs. In other words, the normal position of the latch end 180 is shown in Figures 2A, 12 and 13.

The member 180 is also slidably mounted in angle member 181 which is secured to the side of bracket 177. Disposed around this member 180 is a compression spring 182, one end of said compression spring being adapted to rest against one leg of angle member 181 and its other end against the pin 183 which penetrates member 180. This spring normally tends to force the latch 180 to the position shown in Figure 14 when the member is not latched, but under normal operation the member 180 is latched as shown in Figure 2A.

In order to keep the member 180 latched to the position shown in Figure 2A, a notch 184 is provided into which one end of lever 185 is adapted to fit. This lever 185 is pivoted as at 186a to a bracket 186 which is supported by the bracket 177. The other end of lever 185 has secured thereto a link 187, the other end of said link being secured to the intermediate portions of lever 188. A tension spring 190 normally holds a lever 185 in latched position as shown in Figure 2A.

The lever 188 is pivoted as at 195 to bracket 196, which bracket is supported by the bracket 178. Pivotally mounted on the free end of lever 188 as at 197, is a feeler member 198. One end of member 198 has projections 199 and 200 integral therewith. During the normal operation of the apparatus, that is, when the cutting and shearing means are not in operation, the end of the feeler is held in engagement with the side edges of the splits 61a or 68a in the manner shown in Figures 2A and 12. Since the gaps between the splits are not sufficiently wide enough to allow the projection 199 to pass therebetween, it is evident that the projection 199 will in no way obstruct the movement of the splits as they pass by projection 199. The tension spring 201 has one end thereof secured to the other end of feeler 198 and the other end of said spring being secured to bracket 178 so that the point 199 will be normally pushed toward and against the splits 61a or 68a.

As previously stated, there is a gap between the end bars 61b of the ribs due to the heads of nails 151 and the thickness of the caps 150. When the gap reaches projection 199, the projection will fall therein as shown in Figure 13. Upon further movement of the ribs, the feeler, as well as the lever arm 188, will be pivoted in a clockwise manner about point 195, (Figures 2A and 14), which, in turn, will rotate the lever 185 through the link 187 in a counter-clockwise manner about pivot point 186a. By the time the feeler 198 has been rotated to the right far enough to cause the end of lever 185 to become disengaged from the notch 184, the gap which is disposed between the end bars 61b is disposed directly in alinement with the end of latch member 180; therefore, when this member is released to assume a position as shown in Figure 14, the projection 199 will be moved out of the gap between the ends of bars 61b to allow the lever 188 to return to normal position under the tension of spring 190, as shown in Figure 14, thereby returning feeler 198 to approximately normal position.

It is seen that with latch 180 disposed within the gap in Figure 14, relative movement between the rib of the reed or comb as well as the metallic band 15 cannot take place; consequently, as the reeds or combs move to the right in the various figures in the drawings, the carriage 128 will likewise be moved. As this carriage is carried to the right, (Figures 1A and 2A), a suitable mechanism will be brought into operation, whereby the knives 173 and 174 will be caused to sever the metallic band and at the same time to secure it around the ends of the ribs.

By referring to Figures 1A, 15 and 16, it is seen that the end of shaft 160 has fixedly secured thereon a clutch 210. The face of this clutch is adapted to engage, at times, the face of another clutch 211, which is slidably keyed on shaft 212. The shafts 160 and 212 are merely connected by a male and female joint; or in fact, they may be entirely separate and apart from each other, if desired. In other words, with the parts in the position shown, relative rotation can take place between the two shafts, and it is only when the clutches 210 and 211 are engaged that the motion of shaft 212 is transmitted to the shaft 160 to cause the severing means to be brought into operation. The shaft 212 has a worm gear 213 fixedly secured on its end which meshes with a worm 214 on the motor shaft 215 of motor 216. Also, a balance wheel 209 is secured on shaft 212 so that the proper momentum will be given to the shaft during the severing operation. As the shaft 212 turns, the clutch 211 will also turn, but since it is slidably keyed on shaft 212, it may move longitudinally thereof so as to engage the face of clutch 210 at the proper time. The means for sliding the clutch 211 longitudinally of shaft 212 to the left in the drawings to cause it to engage clutch 210 comprises a collar 218 which is rotatably mounted around the hub of the clutch.

Pivotally secured as at 219 and 220 respectively, to the upper and lower sides of collar 218, is a forked lever 221 the end of which extends towards the observer in Figures 1A and 15, and has in the free end thereof a slot 222. This slot is penetrated by a bolt 223 which extends downwardly from the framework 125 (Figs. 1A and 15). In order to press the end nearest the observer downwardly against the head of bolt 223 a compression spring 225 is provided.

A tension spring 227 has one end thereof pivotally secured as at 220 to the collar 218 and its other end secured to bearing 158 to normally hold the clutch 211 and its associated parts in position as shown in the drawings where clutch 211 will not engage the clutch 210. As the carriage moves to the right in the drawings, that is, when the end of latch 180 is disposed between the ends of ribs, combs or reeds, it is evident that the clutch 211, collar 219 and its associated parts will also move to the right, thereby causing the slot 222 to move relative to bolt 223, in Figure 15.

Since the upper end of lever 229 is normally engaging the right-hand side of lever 221 in Figures 1A and 15, it is evident that any movement of the carriage 128 and the clutch 211 relative to the framework 125 will be resisted by the upper end of this lever; therefore, the clutch 211 will be caused to move to the left on the shaft 212 until it engages the clutch 210.

When the clutch 211 engages the clutch 210, then the rotation of shaft 212 will be imparted to the shaft 160 which, in turn, will cause the shearing knives 173 and 174 to reciprocate or to be moved toward each other in Figures 11, 12 and 13, to cause the band 15 to be severed between the ends of the rib.

It will be further noted, that the lever 229 is pivoted as at 231 to the longitudinal strut 125a of framework 125, and the lower end of the lever is normally held in a position shown in Figure 1A by means of tension spring 232. A suitable stop or pin 233 normally limits the counter-clockwise movement of this lever under the tension of spring 232. When the carriage has moved to the right far enough to cause the upper end of lever 229 to be rotated in a clockwise manner sufficient to allow the arm 221 to pass thereover, then the arm 229 is snapped back to the position shown in Figure 1A under the tension of spring 232, and at the same time, the clutch 211 is disengaged from the clutch 210 under the tension of spring 227. The knives will also be withdrawn to the position shown in Figure 11 due to the oval-shape of cam 161. However, it should be stated that prior to this disengagement the knives 173 and 174 have been operated to cause the band 15 to be severed.

Upon further movement to the right of the carriage 128 the roller 238 will be caused to ride upon cam surface 239 which surface is disposed on the top of angle bracket 240, said bracket 240 being secured to the upper side of framework 125. Since the roller 238 is secured to the free end of lever 241, its engagement with the cam surface 239 will cause the lever 241 to rotate a slight amount in a clockwise manner about pivot point 242.

Figure 14 shows the position of the roller 238 and the latch member 180 immediately before the roller rides upon the cam surface 239. Upon this rotation of lever 241, as previously described, the extreme free end of the lever 241 will engage the projection 180a on the end of the latch 180, and restore the member 180 to latched position as shown in Figure 2A. Of course when this latch is pulled to this position, the carriage 128 will be disengaged from the moving ribs therein and therefore, the carriage will be allowed to move back to the left in Figure 2A to normal position under the force exerted by a weight 244. This weight is connected to the casting 155 as at 246 by means of a flexible cable 247, which cable is also mounted upon a roller 248. When the parts move back to normal position, then the lever 241 will also return to its normal position under the tension of spring 250.

Lever 241 has a stop 252 secured thereto which projects laterally and then downwardly so that its downwardly extending leg will engage the side of bracket 240 and act as a stop to limit counter-clockwise rotation of lever 241 about point 242.

Special attention is called to the fact that during this severing operation the ends of the metallic band 15 are crimped or rolled around the end of the rib as shown in Figures 9 and 10. This rolling effect is partially due to the peculiar formation of the knives, as it will be noted in Figure 17 that each knife has a beveled surface 173b which normally tends to roll the severed end around the end of the rib. However, the necessary force which is exerted for severing the metallic band is generally sufficient to roll the same in its proper position around the end of the ribs irrespective of the shape of the knives.

It is therefore, seen that we have provided means for passing a plurality of ribs for loom reeds, combs and the like, end for end through a plurality of forming means along with a continuous band of adhesive material whereby the adhesive material will be formed around the ribs to form a rib which has a uniform diameter throughout and which is symmetrical in all respects to the center line of the splits disposed within the rib.

It is also seen that we have provided means for intermittently severing and securing this casing around the ends of the rib simultaneously with the severing of the same, thereby eliminating the necessity of providing any additional fastening means such as rivets or the like.

In the drawings and specification, there has been set forth a preferred embodiment of the invention, and although specific terms are employed, they are used in a generic and descriptive sense only, and not for purposes of limitation, the scope of the invention being set forth in the appended claims.

We claim:

1. Apparatus for encasing the rib of loom reeds, warp combs and the like with a metallic band comprising means for guiding and feeding the reeds, combs and the like along with the metallic band through the apparatus, means for cutting the band into lengths slightly longer than the reed, a plurality of forming means for engaging the band and rolling it around the ribs, and means for rolling the ends of the band inwardly over the ends of the rib.

2. Apparatus for encasing the rib of loom reeds, warp combs and the like, with a metallic band comprising means for guiding and feeding the reeds, combs and the like along with the metallic band through the apparatus, a plurality of forming means for engaging the band and rolling its end edges toward each other around the ribs, and means for cutting the band and bending it over the end of the rib when the said end of the rib reaches a predetermined point in its travel through the apparatus.

3. Apparatus for encasing the rib of loom reeds, warp combs and the like, with a metallic band comprising means for guiding and feeding the reeds, combs and the like along with the metallic band through the apparatus, a plurality of forming means for engaging the band and rolling it around the rib, means for rendering the side of the band which is disposed next to the rib adhesive before it is rolled around the rib, and means for cutting the band and bending its end edges towards each other over the end of the rib when the said end of the rib reaches a predetermined point in its travel through the apparatus.

4. Apparatus for encasing the rib of loom reeds, combs and the like with a metallic band comprising means for guiding and feeding the reeds, combs and the like along with the metallic band through the apparatus, a plurality of forming means for engaging the band and rolling it around the rib, means for rendering the side of the band which is disposed next to the rib adhesive before it is rolled around the rib, and means for heating the band while it is being rolled around the rib.

5. Apparatus for encasing the rib of loom reeds, warp combs and the like with a covering comprising means for guiding and feeding the reeds, combs and the like along with the covering through the apparatus, a plurality of forming means for engaging the covering and rolling it around the ribs, means for rendering the side of the covering which is disposed next to the rib adhesive before it is rolled around the rib, means for heating the covering while it is being rolled around the rib, and means for cutting the covering and bending its end edges toward each other over the end of the rib when the said end of the rib reaches a predetermined point in its travel through the apparatus.

6. Apparatus for rolling a covering over the rib of a warp comb, reed and the like comprising a plurality of forming rollers between which the rib and the covering are passed simultaneously to roll the covering around the rib, and means for cutting the covering and rolling the ends of the covering over the end of the reed, comb and the like when the same has reached a predetermined point in the apparatus.

7. Apparatus for applying a covering to the ribs of loom reeds, combs and the like comprising means for moving the reeds, combs and the like end to end through the apparatus, including a plurality of forming dies for folding the covering around the ribs of the reeds, combs and the like as they are moved through the apparatus, means for detecting the point of contact between two adjacent reeds, combs and the like, cutting and crimping means controlled by said detecting means and being operable to cut the covering at the junction point between two reeds, combs and the like and roll it around the ends of said reeds, combs and the like.

8. Apparatus for folding a band of sheet material around the ribs of loom reeds, combs and the like comprising a plurality of forming rollers for feeding the reeds, combs and the like through the apparatus end to end and at the same time folding the band of sheet material around the rib, means for detecting the junction point between the ends of adjacent reeds, combs and the like, and combined cutting and rolling means for cutting the sheet of material at the junction point of adjacent reeds, combs and the like and rolling it over the ends of said ribs to cover a portion of the said ends.

9. Apparatus for folding a band of sheet material around the ribs of loom reeds, combs and the like comprising a plurality of forming rollers for feeding the reeds, combs and the like through the apparatus end to end and at the same time folding the band of sheet material around the rib, means for detecting the junction point between the ends of adjacent reeds, combs and the like, combined cutting and rolling means for cutting the sheet of material at the junction point of adjacent reeds, combs and the like and rolling it over the ends of said ribs to cover a portion of the said ends, and means for rendering the sheet of material adhesive on the side contacting the ribs before it is folded around the ribs.

10. Apparatus for folding a band of sheet material around the ribs of loom reeds, combs and the like, comprising a plurality of forming rollers for feeding the reeds, combs and the like through the apparatus end to end and at the same time folding the band of sheet material around the rib, means for detecting the junction point between the ends of adjacent reeds, combs and the like, combined cutting and rolling means for cutting the sheet of material at the junction point of adjacent reeds, combs and the like and rolling it over the ends of said ribs to cover a portion of the said ends, and means for rendering the sheet of material adhesive on the side contacting the ribs before it is folded around the ribs, and means for heating the sheet of material while it is applied around the ribs.

EDGAR R. BOND.
CLARENCE A. HOBBS.